US006673188B1

(12) United States Patent
Nakagawa

(10) Patent No.: US 6,673,188 B1
(45) Date of Patent: Jan. 6, 2004

(54) DUSTPROOF SEAL STRIP AND ADHESIVE SYSTEM

(75) Inventor: Yasuyuki Nakagawa, Hirakata (JP)

(73) Assignee: Asahi Kakoshi Co., Ltd., Osaka (JP)

( * ) Notice: Subject to any disclaimer, the term of this patent is extended or adjusted under 35 U.S.C. 154(b) by 0 days.

(21) Appl. No.: 09/913,207

(22) PCT Filed: Feb. 9, 2000

(86) PCT No.: PCT/JP00/00704

§ 371 (c)(1), (2), (4) Date: Aug. 10, 2001

(87) PCT Pub. No.: WO00/47476

PCT Pub. Date: Aug. 17, 2000

(30) Foreign Application Priority Data

Feb. 12, 1999 (JP) ........................................... 11-33859

(51) Int. Cl.[7] ........................... B32B 3/10; B32B 31/10

(52) U.S. Cl. ....................... 156/248; 156/250; 156/543; 428/137; 428/138; 206/815

(58) Field of Search ................................ 156/243, 248, 156/250, 538, 540, 541, 542, 543; 428/40.1, 137, 138; 206/815

(56) References Cited

U.S. PATENT DOCUMENTS

| | | | | |
|---|---|---|---|---|
| 4,545,839 A | | 10/1985 | Nakagawa | 156/244.11 |
| 4,550,048 A | | 10/1985 | Nakagawa | 428/138 |
| 4,661,189 A | * | 4/1987 | Voy et al. | 156/248 |
| 4,844,771 A | * | 7/1989 | Crankshaw et al. | 156/387 |
| 4,851,383 A | * | 7/1989 | Fickenscher et al. | 503/200 |

FOREIGN PATENT DOCUMENTS

| | | | |
|---|---|---|---|
| EP | 0 812 771 A1 | 12/1997 | B65D/5/46 |
| JP | 58-188646 | 11/1983 | B31B/1/86 |
| JP | 60-190611 | 12/1985 | B65D/5/46 |
| JP | 62-168850 | 7/1987 | B65D/5/46 |
| JP | 62-193937 | 8/1987 | B65C/9/46 |
| JP | 3-81809 | 8/1991 | B65C/1/02 |
| JP | 9-164612 | 6/1997 | B31D/1/02 |

* cited by examiner

*Primary Examiner*—Richard Crispino
*Assistant Examiner*—Sue A. Purvis
(74) *Attorney, Agent, or Firm*—Darby & Darby

(57) ABSTRACT

There is disclosed a dust sealing label strip having a plurality of dust sealing labels arranged on a release liner strip for application over a handle opening of a corrugated box to seal the opening. The strip is usable in rapid application of the sealing labels over handle openings of corrugated boxes to provide seal to the corrugated boxes and function as grips for the box. Each of the dust sealing labels has a substrate having an aperture provided corresponding to the handle opening of a corrugated box, a stretchable film laminated to the substrate to cover the aperture, and an adhesive layer. The plurality of dust sealing labels are arranged peelably via the adhesive layer on the release liner strip in at least one line at predetermined intervals.

4 Claims, 5 Drawing Sheets

(a)

(b)

(a)

(b)

DUSTPROOF SEAL STRIP AND ADHESIVE SYSTEM

FIELD OF ART

The present invention relates to a dust sealing label strip having a plurality of dust sealing labels for sealing handle openings provided in a corrugated box for handling, and a system using the dust sealing label strip for applying the dust sealing labels over the handle openings of a corrugated box.

BACKGROUND ART

Corrugated boxes are known having a pair of handle openings in its opposed side walls for handling. Such handle openings are convenient for handling, but allow contaminants to enter the interior of the corrugated box. Such entrance of contaminants may, for example, cause deterioration of quality or failure of the packaged goods when the goods packaged in the corrugated box are pharmaceutical products, precision machinery, or the like.

In this regard, corrugated boxes with no handle opening are often used for packaging pharmaceutical products and the like, which results in inconvenience in handling. Alternatively, it is proposed to wrap the goods in a film before packaging in a corrugated box with handle openings. In this case, however, quite onerous operations are required in wrapping the goods in a film.

In order to overcome these troubles, for example, JP-A-62-168850 and JP-A-58-188646 propose dust protective pieces that block handle openings of a corrugated box yet allow fingers to be inserted through the openings. Such conventional dust protective pieces are discussed with reference to FIG. 8 below.

FIG. 8(*a*) is a plan view of a strip 80 consisting of a plurality of contiguous dust protective pieces 80*a* connected in series, and FIG. 8(*b*) is a cross sectional view taken along lines B—B in FIG. 8(*a*).

The strip 80 is provided with perforated lines 81 along the opposed ends of each dust protective piece 80*a* for facilitating splitting of the strip into each dust protective piece 80*a*. Each dust protective piece 80*a* includes a cardboard 82 having an aperture 82*a* provided corresponding to a handle opening of a corrugated box, a film 83 laminated to the front surface of the cardboard 82 to seal the aperture 82*a*, and an adhesive layer 84 applied over the rear surface of the cardboard 82. The film 83 is made of a highly stretchable material such as polyurethane or latex, so that fingers may be inserted through the handle opening while the opening is blocked with the film. It is also proposed to provide a release liner over the adhesive layer 84 on the strip 80 for protecting the adhesive layer.

Before applying this dust protective piece 80*a* over a handle opening of a corrugated box, it is necessary to cut the strip 80 along the perforated lines 81 into pieces, apply water over the adhesive layer to give adhesiveness, and manually apply each piece to the desired location on the corrugated box. When a release liner is provided over the adhesive layer, it is also necessary before use to cut the strip 80 along the perforated lines 81 into pieces as the strip 80 is peeled from the release liner, and manually apply each piece to the desired location on the corrugated box.

In the prior art discussed above, it is required to cut the strip and, after the strip is split into single pieces, to pick and apply each single piece to the desired location on a corrugated box. Thus, in order to mechanize the process from the cutting of the strip of contiguous dust protective pieces into pieces to the application of each cut-off dust protective piece to a desired location on a corrugated box, mechanization is particularly required of the series of operations including picking up of each separated single dust protective piece and applying the same to a desired location on a corrugated box, which is quite difficult. Accordingly, such series of operations are in practice performed manually.

In spite of such difficulties, demand for corrugated boxes with such dust seals has recently been increasing, in particular in the medical industries. Development of a system is thus demanded for applying more rapidly dust protective pieces that seal handle openings of corrugated boxes and yet provide grips on the boxes, to realize mass production of corrugated boxes having dust protective pieces attached thereto in a short time.

In order to ensure sufficient strength of the handle openings of a corrugated box, the dust protective piece of the art is made of cardboard acting as a substrate to which the film is attached, as discussed above. When such dust protective pieces are attached to the outer surface of a corrugated box, the pieces may be damaged or peeled off due to abrasion between the boxes during transportation, which may also cause problems in appearance. Thus conventional dust protective pieces are usually applied to the inner surface of a corrugated box. Application of the dust protective pieces to the inner surface of a box may be easily performed manually, but cannot be mechanized readily.

DISCLOSURE OF THE INVENTION

It is an object of the present invention to provide a dust sealing label strip having dust sealing labels that seal a corrugated box against dust and provide grips on the box, and usable in rapid application of the sealing labels over handle openings of corrugated boxes.

It is another object of the present invention to provide a dust sealing label strip having dust sealing labels that may be applied on the outer surface of a corrugated box to seal its handle openings without being damaged or peeled off due to abrasion of the corrugated boxes during transportation, and usable in rapid application of the sealing labels over the handle openings of corrugated boxes.

It is yet another object of the present invention to provide a system for applying dust sealing labels that enables rapid application of dust sealing labels over handle openings of corrugated boxes, and realizes mass production of the corrugated boxes with the dust sealing labels in a short time.

According to the present invention, there is provided a dust sealing label strip comprising a plurality of dust sealing labels arranged on a release liner strip for application over a handle opening of a corrugated box to seal the opening, each of said dust sealing labels comprising:

- a substrate having an aperture provided corresponding to a handle opening of a corrugated box,
- a stretchable film laminated to said substrate to block said aperture, and
- an adhesive layer,
- wherein said plurality of dust sealing labels are arranged peelably via said adhesive layer on said release liner strip in at least one line at predetermined intervals.

The dust sealing label strip according to the present invention (sometimes referred to as a “strip of the present invention” hereinbelow) is characterized particularly by the peelable and adhesive arrangement of the plurality of dust sealing labels on a release liner strip in at least one line at predetermined intervals. The present strip is not a strip of a plurality of contiguous dust sealing labels that are to be cut into pieces, nor a strip of a plurality of contiguous dust sealing labels.

The present strip has the characteristic features mentioned above, so that the conventional strip-cutting step may be eliminated. Further, when the present strip is used in a system for applying dust sealing labels to be discussed later, the conventional series of manual operations including picking up of each separated single dust protective piece and applying the same to a desired location on the corrugated box, may be mechanized. Thus, the present strip enables rapid application of the dust sealing labels to handle openings of corrugated boxes and thus mass production in a short time of the corrugated boxes with the dust sealing labels applied thereon.

In the present strip, if a plurality of dust sealing labels are arranged contiguously on a release liner strip without predetermined intervals, it will be difficult, for example, to ensure peeling of a predetermined number of dust sealing labels in a suction sticker to be discussed later. Such arrangement may also cause failure to accurately position the dust sealing label on a corrugated box, following the peeling of the label from the strip, which makes it difficult to automate this series of operations.

In the present strip, it suffices if a plurality of dust sealing labels are arranged peelably in at least one line on the release liner strip at predetermined intervals. The predetermined intervals are usually regular intervals, and may suitably be selected depending on the design of the system for applying the labels. For example, the intervals may be selected from the range of 0.5 to 10 mm. The dust sealing labels are usually arranged in one line along the longitudinal axis of the strip, but may be in a plurality of lines, in particular in an even number of lines such as two lines, depending on the design of the system for applying the labels.

The strip of the present invention preferably has enough flexibility to be wound into a roll. A rolled strip occupies minimum space, so that the system for mechanizing the successive application of the dust sealing labels over the handle openings of corrugated boxes may also be in a minimum size. Such flexibility may be given to the strip by suitably selecting the material and the thickness of each layer constituting the dust sealing label.

In the present strip, it is preferred to provide, as an outermost layer of the dust sealing label arranged peelably, a layer of a material having a lower friction than that of the surfaces of the substrate and the stretchable film constituting the dust sealing label. With such a material layer having a lower friction being provided as the outermost layer, the dust sealing label may be protected from being damaged or peeled off even when the corrugated boxes having the dust sealing labels applied thereon are abraded during transportation.

The material layer may preferably be made of a material such as silicon, a nitrocellulose/polyamide-containing resin, or amixture of these.

According to the present invention, there is also provided a system for applying dust sealing labels, said system successively conveying corrugated boxes with handle openings, while successively applying dust sealing labels over the handle openings of the corrugated boxes being conveyed, said system comprising:

conveying means for successively conveying corrugated boxes with handle openings, and application means for peeling a dust sealing label from a roll of a dust sealing label strip of claim 1, holding said label, and subsequently applying said label over a handle opening of a corrugated box conveyed by said conveying means.

With this system for applying dust sealing labels employing the dust sealing label strip of the present invention, a series of operations for applying a dust sealing label on a corrugated box having handle openings may be automated. In particular, application of dust sealing labels over the handle openings of corrugated boxes may be fully automated to achieve in a short time mass production of corrugated boxes having the dust sealing labels applied thereon.

In the present system for applying dust sealing labels, the application means may be a suction sticker for peeling and holding a dust sealing label from a dust sealing label strip by means of suction, and subsequently applying the label over a handle opening of a corrugated box conveyed by the conveying means, a suction sticker for repeatedly performing steps of peeling and holding two dust sealing labels separately from dust sealing label strips by means of suction, and applying the labels simultaneously over a pair of handle openings, respectively, of a corrugated box conveyed by said conveying means, or the like device.

PREFERRED EMBODIMENTS OF THE INVENTION

Preferred embodiments of the present invention will now be explained with reference to the accompanied drawings.

Figure 1:
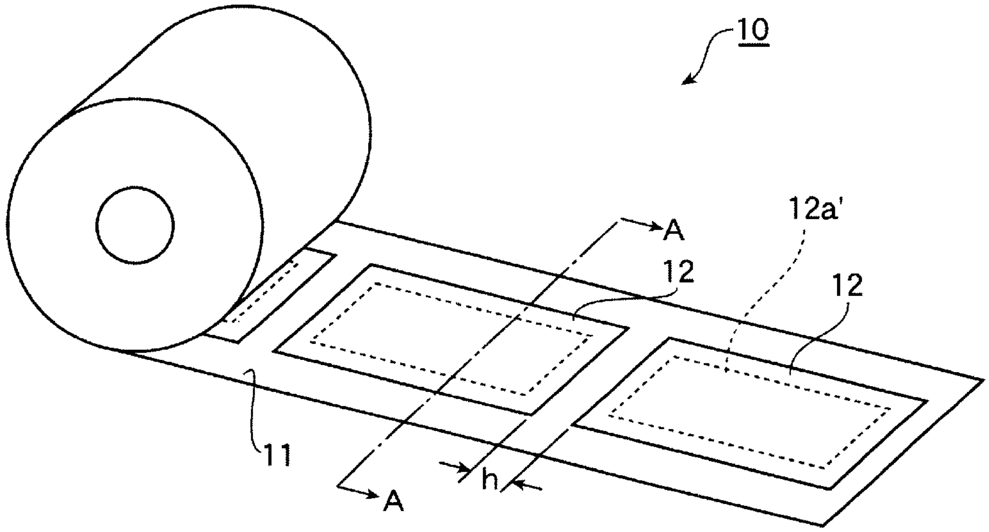
FIG. 1 is a schematic view showing an embodiment of a dust sealing label strip according to the present invention.
Figure 2:
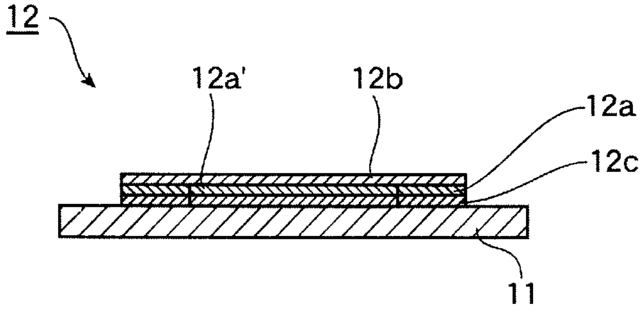
FIG. 2 (*a*) is a cross sectional view taken along lines A—A in FIG. 1, and FIG. 2(*b*) is a cross sectional view of a dust sealing label having a silicon layer of a low friction provided as its outermost layer.
Figure 2:
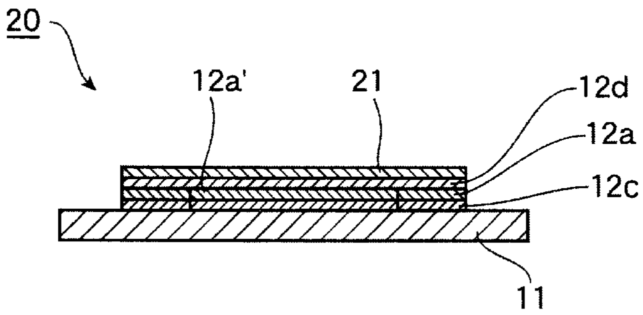

FIG. 1 is a schematic view of dust sealing label strip 10 of the present invention, and FIG. 2 is a cross sectional view taken along lines A—A in FIG. 1.

The dust sealing label strip 10 includes a release liner 11 in the form of a strip wound into a roll, and a plurality of dust sealing labels 12 peelably mounted on the release liner 11 in one line at predetermined intervals h. As seen in FIG. 1, the dust sealing labels 12 are oriented such that the longitudinal axes of the labels 12 are in parallel with the longitudinal axis of the release liner 11. However, the labels 12 may alternatively be arranged rotated for 90 degrees so that the longitudinal axes of the labels 12 are at right angles to the longitudinal axis of the release liner 11.

Each of the dust sealing labels 12 includes a substrate 12*a* having an aperture 12*a*' provided corresponding to a handle opening of a corrugated box, a stretchable film 12*b* laminated to the front surface of the substrate 12*a* to block the aperture 12*a*', and an adhesive 12*c* applied to the rear surface of the substrate 12*a*. The dust sealing labels 12 are peelably mounted on the release liner 11 via the adhesive 12*c*.

The substrate 12*a* may be made of paper or plastic. The stretchable film 12*b* may be made of polyurethane or latex. The adhesive 12*c* may be a pressure sensitive adhesive or a thermosensitive adhesive.

The stretchable film 12*b* is tacky on its surface, so that the dust sealing labels 12 may be damaged or peeled off due to the friction between the adjacent corrugated boxes having the dust sealing labels 12 when the boxes are shaken during transportation.

In order to avoid such damage, a low friction material such as silicon or nitrocellulose/polyamide-containing resin may be applied over the front surface of the stretchable film 12*b* to form a material layer of a lower friction than that of the stretchable film 12*b*. A dust sealing label 20 provided with such a material layer is shown in FIG. 2(*b*) in cross section. The dust sealing label 20 includes a substrate 12*a*, a stretchable film 12*b*, and an adhesive 12*c*, all corresponding to those of the dust sealing label 12 discussed above, and further a material layer 21 of silicon with a low friction is provided on the front surface of the stretchable film 12*b* as an outermost layer.

Next, an example of the production process of a dust sealing label strip 30 of the present invention is explained with reference to FIG. 3.

Figure 3:
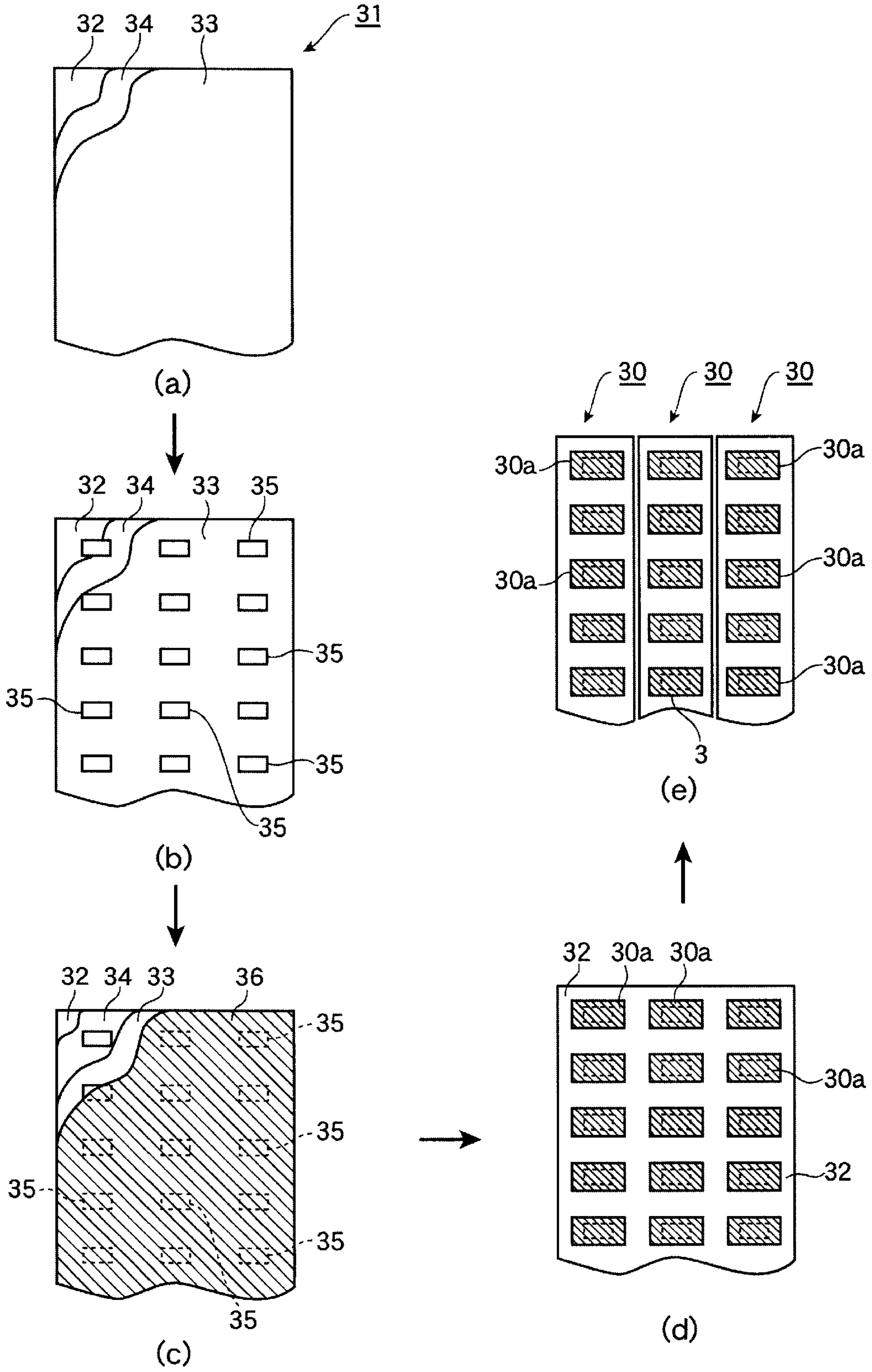
FIG. 3 is an explanatory flow chart illustrating an example of a process for producing a dust sealing label strip of the present invention, wherein (a) is a partial fragmentary view of a material sheet for the dust sealing label strip, (b) is a partial fragmentary view of the material sheet in which apertures are provided corresponding to handle openings, (c) is a partially perspective fragmentary view of the sheet shown in (b) further provided with a stretchable film laminated thereto, (d) is a partially perspective fragmentary view of the sheet shown in (c) with excess portions removed, and (e) is a partially perspective fragmentary view illustrating the sheet shown in (d) cut into strips.

A dust sealing strip 30 of the present invention is produced from a material sheet 31 shown in FIG. 3(*a*). The material sheet 31 includes a release liner strip 32 and a substrate strip 33 peelably mounted on the liner 32 via an adhesive 34.

First, the material sheet 31 is provided with apertures 35 each corresponding to a handle opening of a corrugated box at predetermined intervals (see FIG. 3(*b*)). The apertures 35 may be provided through the material sheet 31 by, for example, punching with a Thomson punch.

Next, a stretchable film 36 is uniformly laminated over the front surface of the substrate 33 (see FIG. 3(*c*)), so that the apertures 35 are covered with the stretchable film 36. The material layer 21 discussed above and shown in FIG. 2(*b*) may be provided by, after the lamination of the stretchable film 36, applying and curing silicon or the like material for forming the material layer 21 over the film 36.

Subsequently, in order to form dust sealing labels 30*a* shown in FIG. 3(*d*) at predetermined intervals, at least the substrate 33 and the stretchable film 36 around the dust sealing labels 30*a* are removed, leaving the release liner 32 and the portions constituting the dust sealing labels 30*a* (see FIG. 3(*d*)). Specifically, only the substrate 33 and the stretchable film 36 are incised along the periphery of the parts of the material sheet 31 forming the dust sealing labels 30*a*, and the excess parts are peeled from the release liner 32.

Finally, the release liner 32 is cut along its longitudinal axis to separate each line of the dust sealing labels 30*a* thus formed, to thereby produce the dust sealing label strips 30 in each of which the dust sealing labels are arranged in one line at predetermined intervals (see FIG. 3(*e*)). The dust sealing label strip 30 thus obtained may be wound into a roll to be in a shape as shown in FIG. 1.

An embodiment of the system of the present invention for applying the dust sealing labels 12 over handle openings of a corrugated box using the dust sealing label strips 10 shown in FIG. 1, is now explained with reference to FIG. 4, which is a schematic view of an application system 40 as an embodiment of the present invention.

The application system 40 includes a belt conveyer 41 as conveying means, and a suction sticker 42 as an application means located in the middle of the belt conveyer 41.

The belt conveyer 41 conveys corrugated boxes 43 on its belt, and has a positioning function to stop the box 43 at a predetermined position when the box 43 comes in front of the suction sticker 42.

The suction sticker 42 peels the dust sealing labels discussed above from the dust sealing label strips 10 by means of suction, and subsequently applies the labels 12 to a corrugated box 43. The suction sticker 42 is specifically provided with two actuators (42*a*, 42*b*) for simultaneously applying the dust sealing labels 12 over the handle openings provided on the opposed sides of a corrugated box 43.

In this application system 40, when a corrugated box 43 is placed on the belt conveyer 41 at the left end thereof, the box 43 is conveyed and stopped in front of the suction sticker 42. Here, the actuators (42*a*, 42*b*) of the suction sticker 42 apply the dust sealing labels 12, which have been peeled from the dust sealing label strips 10, over the handle openings on the opposed sides of the corrugated box. When the application is completed, the conveyer 41 resumes conveyance of the corrugated box 43 rightwards.

In this manner, automatic application of the dust sealing labels 12 is realized, to thereby enable simultaneous application of the dust sealing labels 12 over the handle openings on the opposed sides of a corrugated box 43. As a result, production of a larger amount of corrugated boxes with the dust sealing labels may be achieved in a shorter time.

Figure 5:
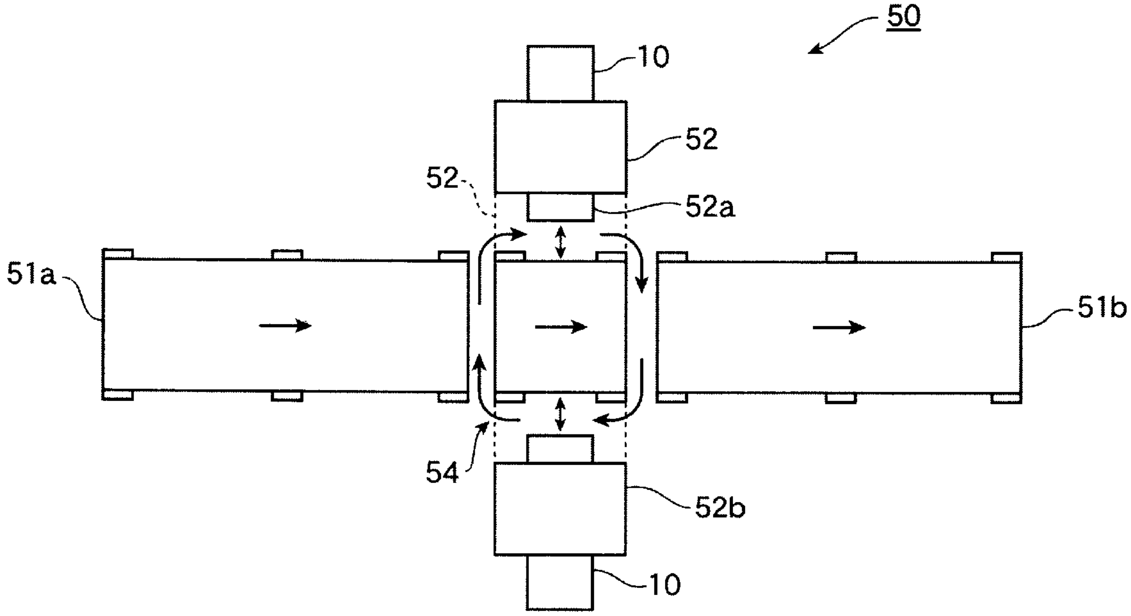
FIG. 5 is a schematic plan view for explaining another embodiment of the application system according to the present invention.

An application system 50 is shown in FIG. 5 as another embodiment of the application system 40.

FIG. 5 is a schematic view, particularly in plan, of an application system 50, which is another embodiment of the present invention.

The application system 50 includes two belt conveyers (51*a*, 51*b*), a turntable 54 positioned between the belt conveyers (51*a*, 51*b*), and a suction sticker 52 provided bridging over the turntable 54.

Figure 4:
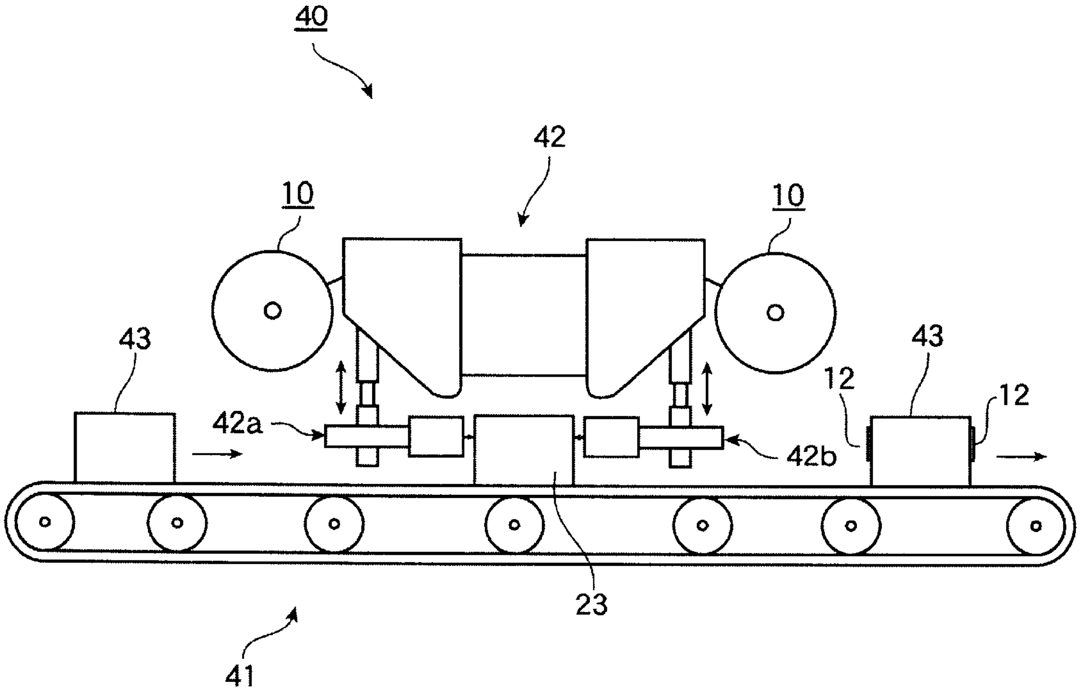
FIG. 4 is a schematic view showing an embodiment of the application system according to the present invention.

The belt conveyers (51*a*, 51*b*) are shorter than the belt conveyer 41 shown in FIG. 4, and convey corrugated boxes mounted thereon from the left to the right as seen in FIG. 5.

The two suction stickers 52 are located on the opposite sides of the turntable 54, peel the dust sealing labels 12 mentioned above from the dust sealing label strips 10 by means of suction, and subsequently apply the labels 12 over the handle openings of a corrugated box conveyed onto the turntable 54.

The turntable 54 receives a corrugated box conveyed by the belt conveyer 51*a* on its left, sends forth the box to the belt conveyer 51*b* on its right, and particularly rotates on the spot. In other words, the turntable 54 functions to rotate a received corrugated box so that the sides of the box to which the dust sealing labels are to be applied are not in a facing arrangement with the suction stickers 52, when the received box is positioned otherwise.

The application system 50 is similar in function to the application system 40 discussed above, except for the turntable 54 provided therein.

Figure 6:
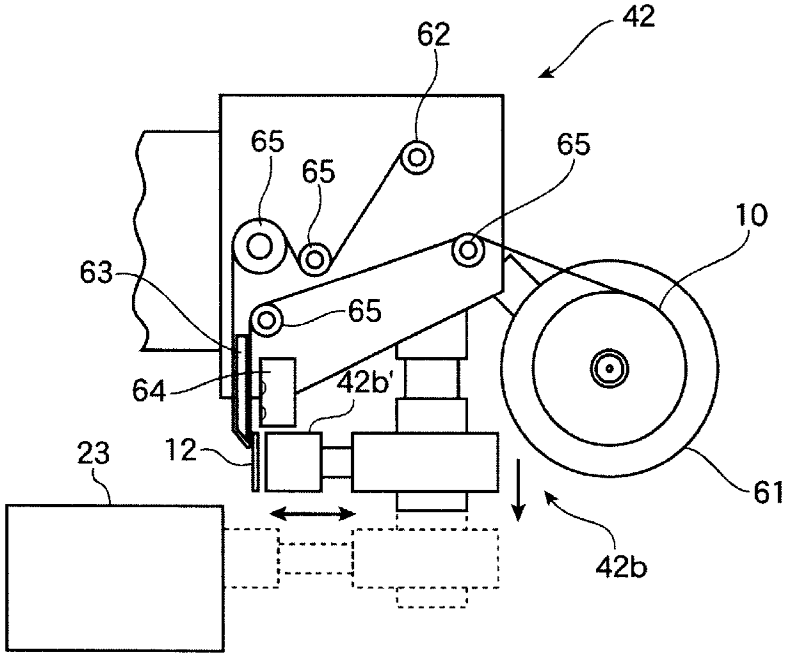
FIG. 6 is a schematic explanatory view of an embodiment of the application means in the application system according to the present invention.

Referring to FIG. 6, the structure of the suction sticker 42 shown in FIG. 4 is explained in detail. FIG. 6 is a detailed explanatory view of the structure of the suction sticker 42 shown in FIG. 4, in particular illustrating the right half of the suction sticker in schematic. The left half of the device also has the similar structure with the opposite orientation.

The suction sticker 42 includes a reel 61 on which the dust sealing label strip 10 is mounted, a take-up roller 62 on which the release liner 11 after the dust sealing labels 12 are peeled is wound, an actuator 42*b*, a peeler 63 for peeling the dust sealing labels 12, a position sensor 64 for detecting the position of the dust sealing labels 12, and a plurality of guide rollers 65 for sending forth or supporting the strip 10.

The strip 10 mounted on the reel 61 travels on the guide rollers 65 and the peeler 63 and is then wound up on the take-up roller 62.

The actuator 42*b* can stretch and retract in vertical and horizontal directions as shown by the arrows in the figure, and is provided with a grid-type vacuum 42*b*' on its end for holding a dust sealing label 12 by means of suction.

The peeler 63 is in a wedge shape. When the strip 10 moves along the contour of the peeler 63, the dust sealing label 12 becomes ready for separation from the release liner 11 at the tip of the wedge due to the wedge shape of the peeler 63, and here the label 12 is sucked and peeled by the vacuum 42*b*'.

The position sensor 64 continuously monitors the position of a dust sealing label 12 on the strip 10 sent onto the peeler 63 in order to accurately peel the label 12 from the strip 10 by means of the actuator 42*b*. Depending on the results of the detection by the position sensor 64, the amount of the liner taken up on the take-up roller 62, the operation timing of the actuator 42*b*, and the like are decided.

In the suction sticker 42, the dust sealing label 12 that is being peeled by the peeler 63 is completely peeled and held by the vacuum 42*b*' of the actuator 42*b* by means of suction applied on the side of the stretchable film 12*b*.

Figure 7:
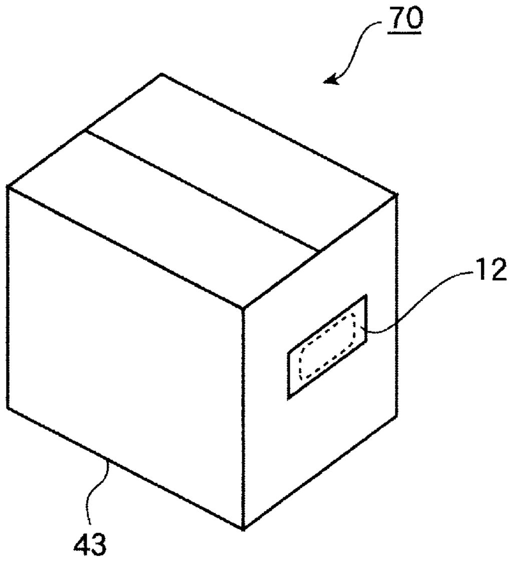
FIG. 7 is an outside view of a corrugated box with the dust sealing labels applied thereto.
Figure 8:
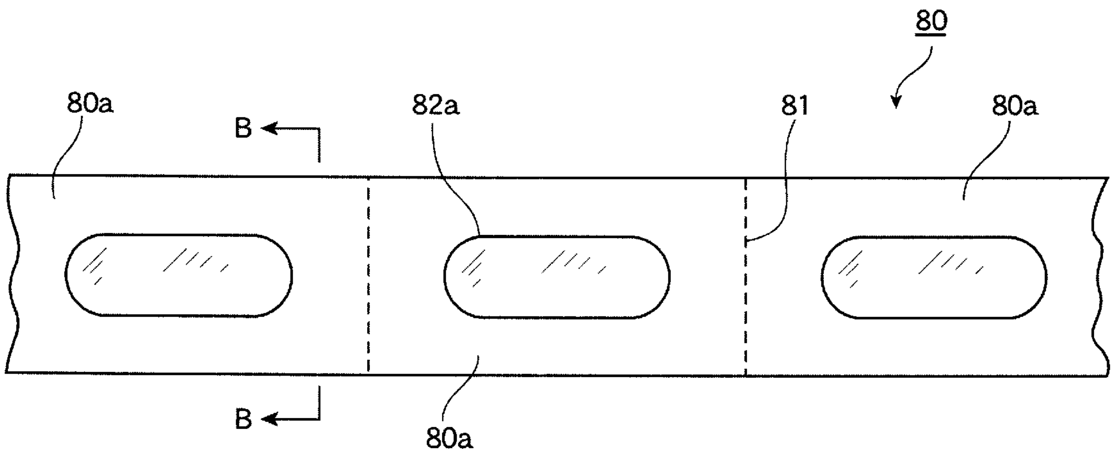
FIG. 8(*a*) is a plan view of a conventional strip of contiguous dust prevention pieces, and FIG. 8(*b*) is a cross sectional view taken along lines B—B in FIG. 8(*a*).
Figure 8:
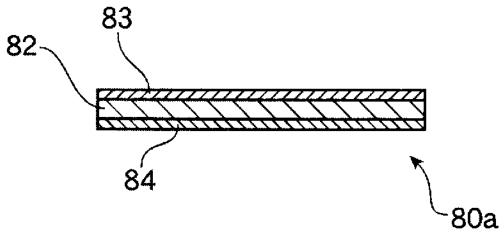

When a corrugated box 43 is conveyed to the front of the suction sticker 42, the actuator 42*b* holding the dust sealing label 12 is moved down to the height of the handle opening, and the vacuum 42*b*' stretches toward the corrugated box 43 to apply the dust sealing label 12 to the corrugated box 42 (shown in phantom in FIG. 6). The dust sealing label 12 is attached to the corrugated box 43 by means of the adhesive 12*c*. A corrugated box 70 wherein the dust sealing labels 12 are attached to the corrugated box 43 is shown in FIG. 7.

The actuator 42*b*, after applying the dust sealing label 12 to the corrugated box 43, is retracted and moved up to the initial position for sucking and peeling the next dust sealing label 12. At the same time, the take-up roll 62 winds up the release liner 11 to cause the strip 10 to advance forward, positioning the next dust sealing label 12 at the peeler 63. These steps are repeated to apply the dust sealing labels 12 to corrugated boxes 43, achieving mass production of the corrugated boxes 70 shown in FIG. 7.

What is claimed is:

1. A dust sealing label strip comprising a plurality of dust sealing labels arranged on a release liner strip for application over a handle opening of a corrugated box to seal the opening, each of said dust sealing labels comprising:

a substrate having an aperture provided corresponding to a handle opening of a corrugated box, a stretchable film laminated to said substrate to block said aperture, an adhesive layer, and a material layer as an outermost layer having a lower friction than the friction of the surfaces of said substrate and said stretchable film, wherein said plurality of dust sealing labels are arranged peelably via said adhesive layer on said release liner strip in at least one line at predetermined intervals.

2. The dust sealing label strip of claim 1, wherein said plurality of dust sealing labels are arranged peelably on said release liner strip in one line at predetermined intervals.

3. The dust sealing label strip of claim 1, wherein said dust sealing label strip has enough flexibility to be wound into a roll.

4. The dust sealing label strip of claim 1, wherein said material layer is made of a material selected from the group consisting of silicon, nitrocellulose/polyamide-containing resins, and mixtures thereof.

* * * * *